US 7,059,780 B2
Jun. 13, 2006

(12) United States Patent
Yamabayashi et al.

(54) FIBER STUB, OPTICAL MODULE, OPTICAL TRANSMITTER, AND OPTICAL COMMUNICATION SYSTEM

(75) Inventors: Naoyuki Yamabayashi, Yokohama (JP); Hiromi Nakanishi, Yokohama (JP); Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 383 days.

(21) Appl. No.: 10/139,521

(22) Filed: May 7, 2002

(65) Prior Publication Data
US 2002/0168153 A1 Nov. 14, 2002

(30) Foreign Application Priority Data
May 9, 2001 (JP) .......................... P2001-138951

(51) Int. Cl.
G02B 6/42 (2006.01)
(52) U.S. Cl. .......................................... 385/88; 385/93
(58) Field of Classification Search ............ 385/81–88, 385/87–94
See application file for complete search history.

(56) References Cited

U.S. PATENT DOCUMENTS

| 4,302,070 | A | * | 11/1981 | Nakayama et al. | ............ 385/88 |
| 5,151,961 | A | * | 9/1992 | Hvezda et al. | ............ 385/60 |
| 5,195,155 | A | * | 3/1993 | Shimaoka et al. | ............ 385/90 |
| 5,278,929 | A | * | 1/1994 | Tanisawa et al. | ............ 385/93 |
| 5,315,680 | A | * | 5/1994 | Musk et al. | ............ 385/88 |
| 5,586,208 | A | * | 12/1996 | Nishiyama | ............ 385/93 |
| 5,612,807 | A | * | 3/1997 | Ishikawa et al. | ............ 398/81 |
| 5,631,987 | A | * | 5/1997 | Lasky et al. | ............ 385/88 |
| 5,845,030 | A | * | 12/1998 | Sasaki et al. | ............ 385/88 |
| 5,857,050 | A | * | 1/1999 | Jiang et al. | ............ 385/92 |
| 5,914,972 | A | * | 6/1999 | Siala et al. | ............ 372/33 |
| 5,963,694 | A | * | 10/1999 | Fujimura et al. | ............ 385/88 |
| 5,993,073 | A | * | 11/1999 | Hamakawa et al. | ............ 385/88 |

(Continued)

FOREIGN PATENT DOCUMENTS

JP 6-5961 1/1994

(Continued)

OTHER PUBLICATIONS

D. M. Bird et al. "Narrow Line Semiconductor Laser using Fibre Grating" Electronics Letters, Jun. 20, 1991, vol. 27, No. 13, pp. 1115-1116.

*Primary Examiner*—Joseph Williams
*Assistant Examiner*—Dalei Dong
(74) *Attorney, Agent, or Firm*—Smith, Gambrell & Russell, LLP

(57) ABSTRACT

The present invention relates to an optical module with a small size and improved mass-productivity. The optical module comprises a fiber stub including an optical fiber, a sleeve containing the fiber stub, and a semiconductor optical amplifying device. A Bragg fiber grating is formed in the optical fiber. The optical fiber is secured in the ferrule. The optical amplifying device and the grating form a laser cavity. Only a part of the hollow portion of the sleeve is filled with the fiber stub. One end face of the optical fiber is disposed at one end of the sleeve. The other end of the sleeve is hollow. The optical module acts as an optical receptacle. An optical plug can be inserted into the hollow end of the sleeve. This enables the laser light to be introduced into an external optical device.

13 Claims, 5 Drawing Sheets

U.S. PATENT DOCUMENTS

| | | | |
|---|---|---|---|
| 6,071,016 A * | 6/2000 | Ichino et al. | 385/92 |
| 6,155,724 A * | 12/2000 | Ichino et al. | 385/92 |
| 6,244,754 B1 * | 6/2001 | Takagi et al. | 385/88 |
| 6,310,997 B1 * | 10/2001 | Kato et al. | 385/37 |
| 6,332,719 B1 * | 12/2001 | Nishikawa et al. | 385/88 |
| 6,366,396 B1 * | 4/2002 | Hayashi | 359/344 |
| 6,394,665 B1 * | 5/2002 | Hayashi | 385/88 |
| 6,409,398 B1 * | 6/2002 | Nakaya et al. | 385/93 |
| 6,415,078 B1 * | 7/2002 | Shigehara et al. | 385/37 |
| 6,490,064 B1 * | 12/2002 | Sakamoto et al. | 398/81 |
| 6,525,872 B1 * | 2/2003 | Ziari et al. | 359/341.3 |
| 6,540,412 B1 * | 4/2003 | Yonemura et al. | 385/88 |
| 6,625,002 B1 * | 9/2003 | Ramakrishnan et al. | 361/203 |
| 6,697,414 B1 * | 2/2004 | Kato et al. | 372/102 |
| 6,736,550 B1 * | 5/2004 | Wang et al. | 385/79 |
| 6,748,413 B1 * | 6/2004 | Bournas | 718/105 |
| 6,772,794 B1 * | 8/2004 | Seguin | 138/30 |
| 6,799,901 B1 * | 10/2004 | Yoshimura et al. | 385/88 |
| 6,819,700 B1 * | 11/2004 | Kato et al. | 372/92 |
| 6,840,684 B1 * | 1/2005 | Melchior et al. | 385/66 |
| 6,843,609 B1 * | 1/2005 | Yonemura | 385/93 |
| 6,893,163 B1 * | 5/2005 | Sato et al. | 385/78 |
| 6,953,290 B1 * | 10/2005 | Nakanishi et al. | 385/93 |

FOREIGN PATENT DOCUMENTS

| | | |
|---|---|---|
| JP | 2000-58975 | 2/2000 |
| JP | 2000-353845 | 12/2000 |
| WO | WO 94/22187 | 9/1994 |

* cited by examiner

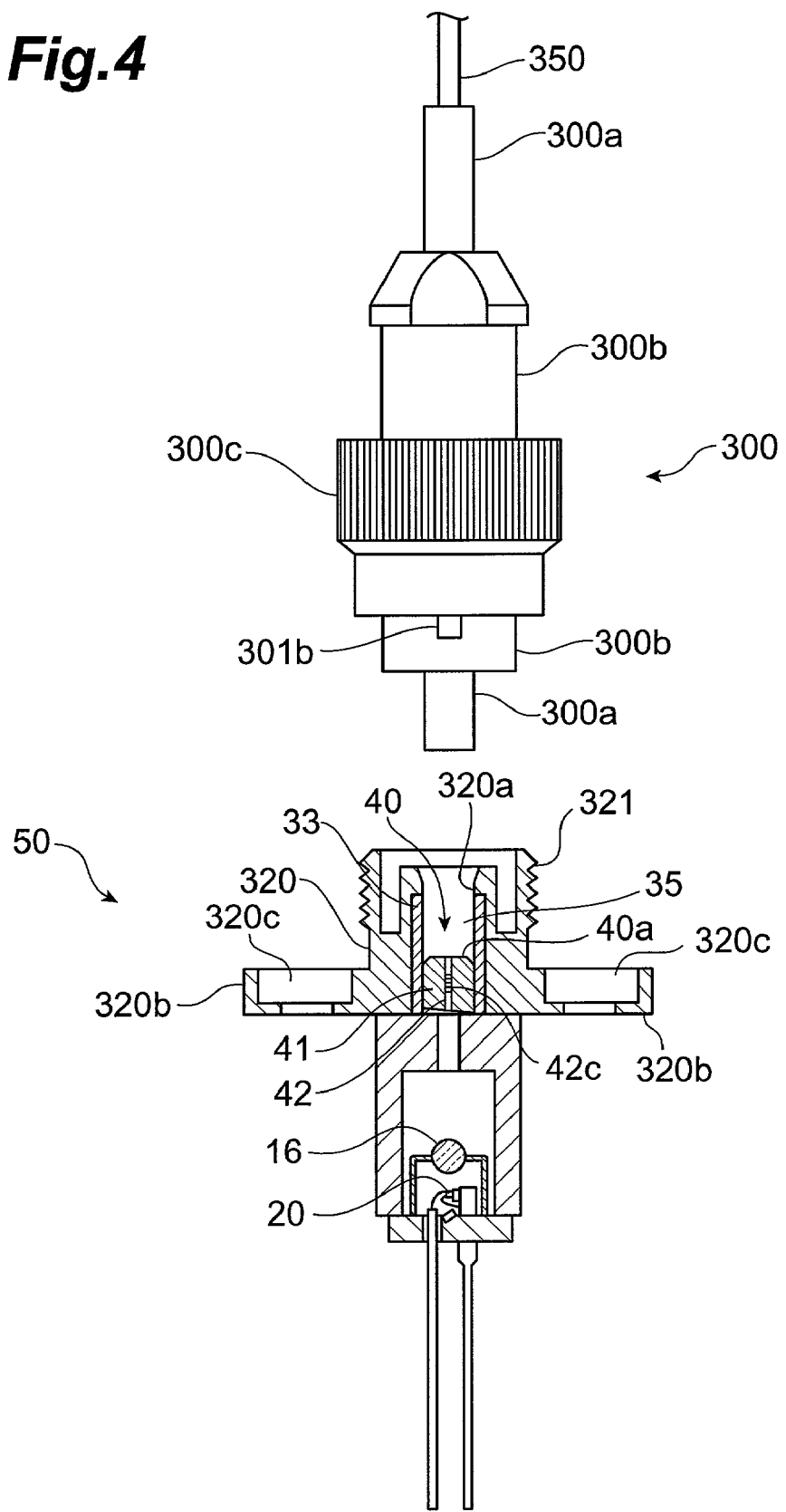

FIBER STUB, OPTICAL MODULE, OPTICAL TRANSMITTER, AND OPTICAL COMMUNICATION SYSTEM

BACKGROUND OF THE INVENTION

1. Field of the Invention

The present invention relates to a fiber stub, an optical module including the fiber stub, an optical transmitter including the optical module, and an optical communication system including the optical transmitter.

2. Related Background Art

Optical modules for supplying signal light to optical fibers have widely been in use in optical communication systems such as optical LAN. Such an optical module is placed within an optical transmitter. In general, an optical module has a semiconductor laser system and an optical system for guiding laser light from the laser system to an external optical fiber. As the laser system, a semiconductor laser device of Fabry-Perot type or DFB type can be used. In addition, an external cavity semiconductor laser system may also be used. In the external cavity system, a semiconductor optical amplifying device and a Bragg grating constitute an optical cavity.

Examples of optical modules using an external cavity semiconductor laser system are disclosed in Electronics Letters, Jun. 20, 1991, vol. 27, No. 13, pp. 1115–1116, Japanese Patent Application Laid-Open No. HEI 6-5961, Publication WO94/22187, and Japanese Patent Application Laid-Open No. 2000-353845. Each of the optical modules disclosed in Publication WO94/22187 and Japanese Patent Application Laid-Open No. 2000-353845 has a pigtail fiber. The fiber has a fiber Bragg grating. The grating and a laser diode within the module constitute an optical cavity.

In the art, it is desired to downsize optical modules and optical transmitters. It is also important to improve their mass-productivity.

SUMMARY OF THE INVENTION

It is an object of the present invention to provide a fiber stub that assists in downsizing an optical module and improving mass-productivity of the optical module.

It is another object of the present invention to provide an optical module and optical transmitter with a small size and improved mass-productivity.

It is still another object of the present invention to provide an improved optical communication system.

The fiber stub in accordance with the present invention comprises a ferrule and an optical fiber held in the ferrule. The ferrule has first and second ends. The fiber has first and second end faces. The fiber has a fiber grating. The fiber extends from the first end to the second end in the ferrule. The first end face of the fiber appears at the first end of the ferrule. The second end face of the fiber appears at the second end of the ferrule.

The optical fiber in the fiber stub has no pigtail. Therefore, an area for arranging the pigtail can be omitted in the optical module or optical transmitter. Also, since there is no pigtail, the optical fiber within the fiber stub can be short. Thus, optical fibers for use in the fiber stub can be made efficiently by forming a plurality of gratings in a long optical fiber and dividing the fiber grating by grating. Therefore, the fiber stub yields a high mass-productivity. Further, the fiber stub without a pigtail is easy to handle. This improves the mass-productivity of the fiber stub. Consequently, the fiber stub in accordance with the present invention can achieve a smaller size and improved mass-productivity of an optical module or optical transmitter.

In another aspect, the present invention provides an optical module. The optical module comprises a fiber stub including an optical fiber, and a semiconductor optical amplifying device having a light-emitting face and a light-reflecting face. The optical fiber has a fiber grating. The optical fiber is optically coupled to the light-emitting face of the optical amplifying device. The fiber grating and the light-reflecting face constitute a laser cavity. The fiber stub comprises a ferrule extending along the optical axis of the optical fiber. The optical fiber is secured in the ferrule. The optical fiber extends from one end to the other end of the ferrule. A first end face of the optical fiber appears at one end of the ferrule. A second end face of the optical fiber appears at the other end of the ferrule. The second end face of the optical fiber opposes the optical amplifying device.

The second end face of the optical fiber may be tilted with respect to the optical axis of the fiber. Preferably, the acute angle formed between the tilted end face and the optical axis of the fiber is at least 82° but not greater than 86°. When light from the optical amplifying device reaches the second end face of the fiber, a part of the light is reflected. When the reflected light enters the optical amplifying device, the device may be adversely affected, for example, light emission intensity decreases or optical noise occurs. When the end face of the optical fiber is tilted with respect to the optical axis, the reflected light can be prevented from entering the optical amplifying device. Therefore, the reflected light does not adversely affect the optical amplifying device.

An antireflection film may be provided on the second end face of the fiber. Since the antireflection film lowers the reflectivity at the end face, the incidence of the reflected light on the optical amplifying device is reduced. Therefore, the adverse effect of the reflection can be suppressed.

The optical module may further comprise a sleeve for containing the fiber stub. The fiber stub fits into a hollow portion of the sleeve. Only a part of the hollow portion is filled with the fiber stub. The second end face of the optical fiber is arranged at one end of the sleeve. The other end of the sleeve is hollow. The optical module may be an optical receptacle. In this case, the hollow end of the sleeve may contain one end of an optical plug to be connected to the receptacle. When the plug is connected to the optical module, the output light from the optical module can easily be supplied to the outside by way of the optical plug.

The optical module may further comprise a stem for supporting the optical amplifying device, a lead terminal extending from the stem, a cap covering the optical amplifying device, and a hollow holder attached to the stem. The optical amplifying device is mounted on the upper face of the stem. The lead terminal is electrically connected to the optical amplifying device. The lead terminal extends through the stem. The cap is mounted on the upper face of the stem. The cap has a through hole in its upper wall. The holder contains the optical amplifying device and the cap. The holder has a through hole in its upper wall. The fiber stub and the sleeve are mounted on the outer face of the upper wall of the holder. When light is emitted from the optical amplifying device, the emitted light passes through the holes of the cap and holder to enter the second end face of the fiber. External circuits such as a power supply circuit and a driving circuit can be connected electrically to the optical amplifying device via the lead terminal.

The holder separates the optical amplifying device and the fiber stub. The distance between the optical amplifying device and the fiber stub can be adjusted by the size of the holder. The distance corresponds to the length of the laser cavity constituted by the light-reflecting face of the optical amplifying device and the fiber grating. That is, the cavity length can be adjusted according to the size (or height) of the holder.

Each of the fiber stub, sleeve, and holder may have a form axially symmetrical about the optical axis of the fiber in the fiber stub. This makes it easier to align the optical axis of the optical module with that of another optical component. Also, an optical module with an axially symmetrical form is easy to handle.

The optical module may further comprise a single lens or complex lens provided in the upper wall of the cap. The lens is placed between the optical amplifying device and the fiber stub. Due to the condensing action of the lens, the light emitted from the optical amplifying device is efficiently led to the fiber.

In still another aspect, the present invention provides an optical transmitter. The optical transmitter comprises a substrate, a panel erected on the substrate, the optical module in accordance with the present invention, a driving circuit provided on the substrate, and electrical wiring provided on the substrate. The optical module is attached to the panel. The electrical wiring electrically connects the optical module to the driving circuit. The driving circuit supplies a driving signal to the optical module via the wiring.

In still another aspect, the present invention provides an optical communication system. This system comprises an optical transmitter, an optical receiver, and an optical fiber channel connected between the optical transmitter and optical receiver. The transmitter includes the optical module in accordance with the present invention.

The system may be a multiwavelength optical communication system. In this case, the system comprises a plurality of optical transmitters. Each of the transmitters includes the optical module in accordance with the present invention. The optical modules have respective oscillation wavelengths different from each other. The system further comprises an optical multiplexer optically coupled to the transmitters. One end of the optical fiber channel is connected to the optical multiplexer. An optical demultiplexer is connected to the other end of the optical fiber channel. A plurality of optical receivers are optically coupled to the optical demultiplexer.

The present invention will become more fully understood from the detailed description given hereinbelow and the accompanying drawings, which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 shows a longitudinal section of a second embodiment of the optical module in accordance with the present invention and a side face of an example of optical plug to be connected to the optical module;

DETAILED DESCRIPTION OF THE PREFERRED EMBODIMENTS

In the following, embodiments of the present invention will be explained in detail with reference to the drawings. In the explanation of the drawings, parts identical or equivalent to each other will be referred to with numerals identical to each other without repeating their overlapping descriptions.

First Embodiment

Figure 1:
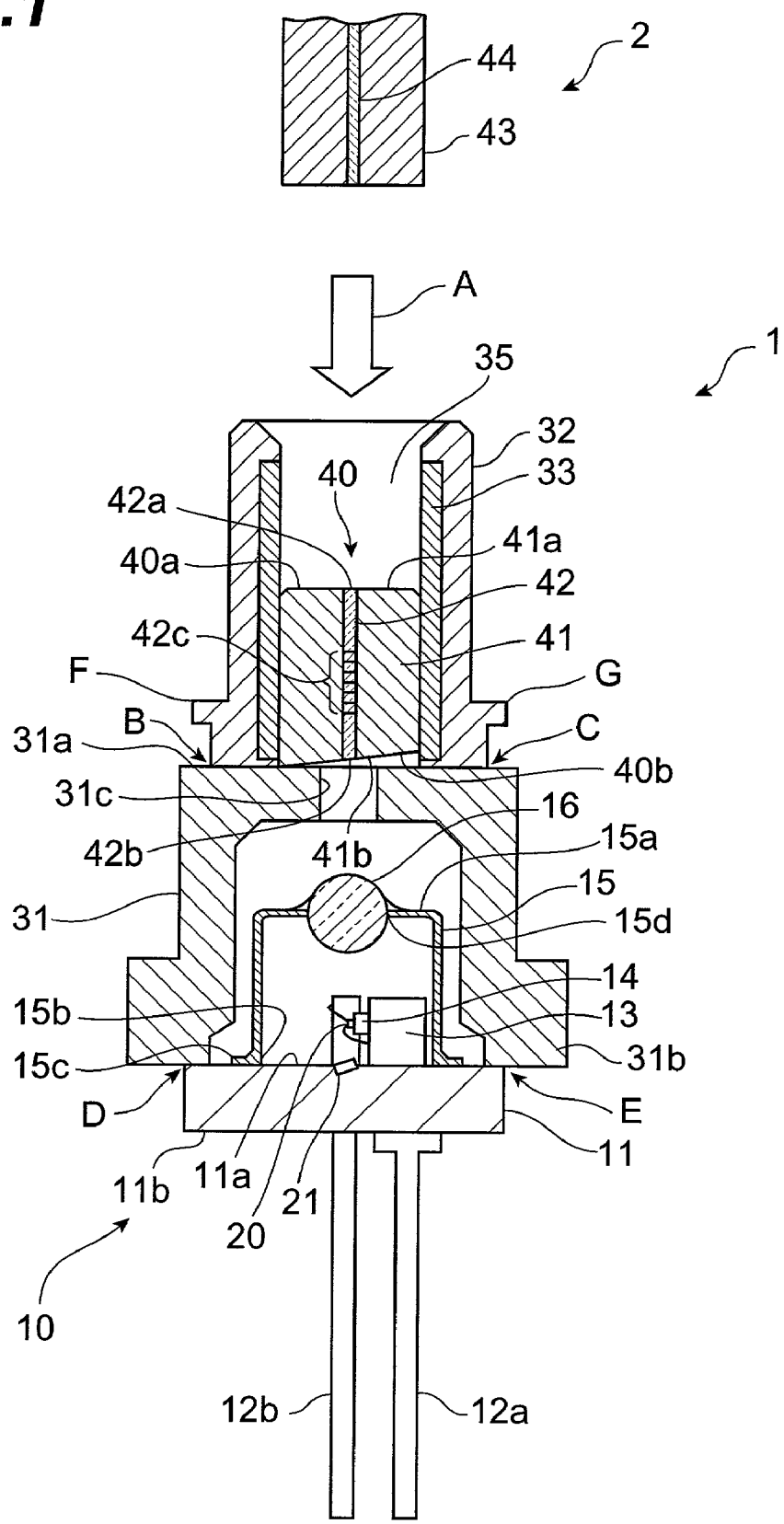
FIG. 1 is a longitudinal sectional view showing a first embodiment of the optical module in accordance with the present invention together with an example of optical plug to be connected to the optical module.

FIG. 1 is a longitudinal sectional view of a first embodiment of the optical module in accordance with the present invention. The optical module 1 comprises a semiconductor optical amplifying device 20 and a fiber stub 40. The semiconductor optical amplifying device 20 is mounted on a mounting member. In the embodiment, a stem 10 is used as an example of the mounting member.

The stem 10 has a body 11, and lead pins 12a and 12b. The body 11 is a substantially circular plate. The body 11 has an upper face 11a and a lower face 11b. Each of the upper face 11a and lower face 11b has a substantially circular form. Both of the elongated lead pins 12a and 12b pass through the body 11. Most of the lead pins 12a and 12b extend outward from the lower face 11b. The body 11 and lead pins 12a and 12b are made of a metal. The lead pins 12a and 12b are electrically insulated from the body 11 by an insulator (not shown in the drawings).

On the upper face 11a, a pole 13 is arranged along an axis. The pole 13 is electrically connected to the lead pin 12a. The pole 13 has a side face extending along the axis. A submount 14 is secured onto the side face. The semiconductor optical amplifying device 20 is secured onto the submount 14.

The optical amplifying device 20 has a multiple quantum well structure. For example, the structure is disposed on an InP substrate and has InGaAsP as an active layer. The optical amplifying device 20 has a light-emitting face and a light-reflecting face on both end faces thereof, respectively. An antireflection film is provided on the light-emitting face. The antireflection film suppresses the reflectivity of the light-emitting face to 0.5% or less, preferably 0.1% or less. In the optical amplifying device 20, a reflecting film is provided on the end face opposite to the light-emitting face. This end face is the light-reflecting face. The light-reflecting face has a reflectivity of at least 30% but not greater than 95%, preferably at least 60% but not greater than 80%.

The antireflection film and reflecting film may be multilayer dielectric films in which dielectrics such as $SiO_2$, $TiO_2$, SiN, $Al_2O_3$, and $MgF_2$ are laminated. When the material and thickness of each dielectric film are determined appropriately, the antireflection film and reflecting film will have the reflectivities of the above ranges, respectively.

The optical amplifying device 20 is secured such that its light-reflecting face opposes the stem body 11 and becomes substantially parallel to the upper face 11a. The optical amplifying device 20 has two electrodes (not shown) as an anode and a cathode. One of the electrodes is connected to the lead pin 12b by a bonding wire, e.g., gold line. The other electrode is connected to the pole 13 by use of a bonding wire. As a result, this electrode is electrically connected to the lead pin 12a by way of the pole 13.

A photodiode (hereinafter referred to as "PD") 21 is mounted on the upper face 11a of the stem body. The light-receiving face of the PD 21 opposes the optical amplifying device 20 to optically couple with the light-reflecting face of the optical amplifying device 20. The PD 21 operates as a monitoring device for detecting the intensity of the light exiting from the optical amplifying device 20. The PD 21 is arranged such that its light-receiving face tilts at an angle with respect to the light-reflecting face of the optical amplifying device 20. This will be achieved if the upper face 11a is provided with a recess having a tilted face, and the PD 21 is disposed on the tilted face.

A cap 15 is attached to the upper face 11a. The cap 15 is substantially formed like a lidded cylinder. The cap 15 has an upper wall 15a and an opening 15b at the both ends. The cap 15 may be made of a metal. The upper wall 15a has a circular through hole 15d in its center. A lens 16 is fitted into the hole 15d. Preferably, the lens 16 is a spherical ball lens or aspheric lens. The lens 16 is optically coupled to the light-emitting face of the optical amplifying device 20, and to an optical fiber 42 which will be explained later. The lens 16 converges the light from the optical amplifying device 20 into the optical fiber 42.

An annular flange 15c is provided around the opening 15b. The cap 15 is secured by welding the bottom face of the flange 15c to the upper face 11a of the stem body 11.

When welding the cap 15 to the stem 11, optical axis alignment may be carried out by the following procedure, for example. The optical amplifying device 20 and PD 21 are mounted in place. The optical amplifying device 20 is electrically connected to the lead pins 12a, 12b. The PD 21 is electrically connected to a lead pin that is not shown in the drawings. The cap 15 is mounted on the body 11 such that the lower face of the flange 15c comes into contact with the upper face 11a of the body. Thereafter, a level of current is applied between the lead pins 12a and 12b to cause light emission of the optical amplifying device 20. The intensity of the light emitted from the optical amplifying device 20 through the lens 16 is monitored. For positioning, the cap 15 is slid on the upper face 11a to find a position that causes the intensity of the light to be a predetermined value or higher. After the position is found, electric welding is carried out while the cap 15 is held at this position, and thereby the cap 15 is secured to the body 11. Thus, the optical axis alignment is finished.

Preferably, the foregoing operation is carried out in the atmosphere of an inert gas, e.g., nitrogen ($N_2$) or argon (Ar). In this case, the inside of the cap 15 is easily filled with the inert gas.

A hollow holder 31 containing the cap 15 is attached to the body 11 of the stem 10. The holder 31 is formed like a lidded cylinder. The holder 31 has an upper wall 31a at its upper end. The lower end of the holder 31 is provided with a flange 31b. The upper wall 31a is provided with a through hole 31c extending along the center axis of the holder 31. The flange 31b is secured onto the upper face 11a of the stem body.

Preferably, the holder 31 is made of a metal, e.g., stainless steel. Preferably, in this case, the holder 31 and the body 11 are secured to each other by welding. The holder 31 is secured, for example, as follows. First, the holder 31 is mounted on the upper face 11a to contain the cap 15. Subsequently, the holder 31 and the body 11 are positioned such that their center axes coincide with each other, by use of a holding jig, for example. At positions indicated by letters D and E in FIG. 1, the holder 31 and the body 11 are welded to each other electrically or by use of a YAG laser.

An outer sleeve 32, an inner sleeve 33, and the fiber stub 40 are secured onto the outer face of the upper wall 31a of the holder. Preferably, the outer sleeve 32 is made of stainless steel. The outer sleeve 32 is substantially cylindrical. Within the outer sleeve 32, the inner sleeve 33 and the fiber stub 40 are held. Thus, the outer sleeve 32 also functions as a holding member for holding the inner sleeve 33 and the fiber stub 40.

The inner sleeve 33 also holds the fiber stub 40. Preferably, the inner sleeve 33 is made of zirconia. Preferably, the inner sleeve 33 is a so-called split sleeve. If the inner sleeve 33 is a split sleeve having an inner diameter slightly smaller than the outer diameter of the fiber stub 40, the fiber stub 40 will be secured firmly to the inner sleeve 33 when the fiber stub 40 is simply inserted into the fiber stub 40.

The fiber stub 40 is substantially cylindrical. The fiber stub 40 has a first face 40a and a second face 40b at the both ends. In the following, the end face 40a farther from the optical amplifying device 20 and the end face 40b closer to the device 20 will be referred to as first and second end faces, respectively.

The fiber stub 40 is constituted by a tubular ferrule 41 and the optical fiber 42 inserted into the ferrule 41. The optical fiber 42 has a core provided with a fiber Bragg grating 42c. The first end face 40a of the fiber stub 40 is constituted by a first end face 41a of the ferrule 41 and a first end face 42a of the optical fiber. The second end face 40b of the fiber stub 40 is constituted by a second end face 41b of the ferrule 41 and a second end face 42a of the optical fiber.

Preferably, the second end face 41b of the ferrule 41 and the second end face 42b of the optical fiber 42 are tilted at an angle of at least 82° but not greater than 86° with respect to the optical axis of the optical fiber 42. This tilt can prevent light reflected by the second end faces 41b and 42b from returning to the optical amplifying device 20. This restrains the optical amplifying device 20 from lowering the output and generating optical noise.

The foregoing explains a case where the second end faces 41b and 42b are tilted with respect to the optical axis of the optical fiber 42. In place thereof or together therewith, however, an antireflection film may be provided on the second end face 41b and/or 42b. The antireflection film may also be a dielectric multilayer film composed of $SiO_2$, $TiO_2$, SiN, $Al_2O_3$, $MgF_2$, and the like. The reflectivity of the antireflection film is preferably 0.5% or less, more preferably 0.1% or less. The antireflection film reduces the reflection of light at the second end face 41b and/or 42b. This restrains the optical amplifying device 20 from lowering the output and generating optical noise.

The outer sleeve 32 is secured onto the outer face of the upper wall 31a of the holder 31. For this securing, electric welding or YAG laser welding is used favorably. At the welding step, optical axis adjustment may be carried out by the following procedure. First, the inner sleeve 33 and the fiber stub 40 are housed within the outer sleeve 32 and secured. Subsequently, the outer sleeve 32 is mounted on the outer face of the upper wall 31a of the holder 31. Thereafter, light is emitted from the optical amplifying device 20. This light is transmitted through the lens 16 and then through the hole 31c of the holder 31 to reach the second end face 40b of the fiber stub 40. The outer sleeve 32 is slid on the upper wall 31a such that the light enters the second end face 42b of the optical fiber 42. This adjusts the position of the fiber 42 appropriately. The intensity of the light emitted from the first end face 42a is monitored. For positioning, the outer sleeve 32 is slid to find a position that causes the intensity of the light to be a predetermined value or higher. Thereafter, while the outer sleeve 32 is held at the position, the outer sleeve 32 and the holder 31 are welded to each other at positions indicated by letters B and C in FIG. 1. As a result, the outer sleeve 32, inner sleeve 33, and fiber stub 40 are secured to the holder 31.

A part of the second end face 40b of the fiber stub 40 is in contact with the upper wall 31a of the holder. The inner sleeve 33 is longer than the fiber stub 40. Therefore, the side face of the fiber stub 40 mates with only a part of the inner wall surface of the inner sleeve 33. The second end face 42b of the optical fiber 42 is placed at one end of the inner sleeve 33. The other end of the inner sleeve 33 is hollow. That is, the first end face 40a of the fiber stub and the part of the inner wall surface of the inner sleeve 33 not mating with the side face of the fiber stub 40 define a space 35 in one of the end portions of the inner sleeve 33.

The outer sleeve 32, inner sleeve 33, and fiber stub 40 form a receptacle of an optical connector. Therefore, a plug of an optical connector can be inserted into the optical module 1.

When an optical plug 2 is connected to the optical module 1, a ferrule 43 within the plug 2 fits into the space 35 as shown in FIG. 1. The ferrule 43 is inserted into the space 35 along the direction indicated by arrow A in FIG. 1. An optical fiber 44 is inserted in the ferrule 43. When the optical plug 2 is connected to the optical module 1, the optical fibers 42 and 44 optically couple with each other. Thus, the laser light from the optical module 1 is lead to the optical fiber 44 through the fiber 42.

Each of the inner diameter of the second sleeve 33 and the outer diameter of the fiber stub 40 are determined to be almost the same as the outer diameter of the ferrule 43. Accordingly, the fiber 42 in the stub 40 and the fiber 44 in the ferrule 43 can be optically coupled in an easy way.

The optical plug 2 can be detachably attached to the optical module 1 by protrusions F and G provided on the outer side face of the outer sleeve 32. Thus, the outer sleeve 32 functions as a connecting member for connecting the optical plug 2 to the optical module 1.

Preferably, when the optical plug 2 is connected to the optical module 1, one end face of the optical fiber 44 in the plug 2 is physically in contact with the first end face 42a of the fiber 42 in the module 1. As a result, the laser light transmitted through the fiber 42 is efficiently introduced into the external fiber 44. More preferably, the first end face 42a of the fiber 42 slightly projects from the first end face 41a of the ferrule 41. This makes surer that the fiber 42 in the module 1 and the fiber 44 in the plug 2 come into contact with each other. Therefore, the laser light is more efficiently introduced into the external optical fiber 44.

In this embodiment, the outer diameter of the optical module 1 is 8 to 10 mm at the maximum. The length from the lower end of the stem body 11 to the upper end of the second sleeve 32 is 13 to 15 mm. By contrast, the length of the optical module in the prior art using an external cavity semiconductor laser system is the sum of the length of its package, which is about 20 to 30 mm, and the length of its pigtail fiber, which is about 1 m. As can be seen from this comparison, the optical module 1 is very small. Therefore, the optical module 1 can be used favorably if it is desired to downsize a circuit board in an optical transmitter, for example.

Figure 2A:
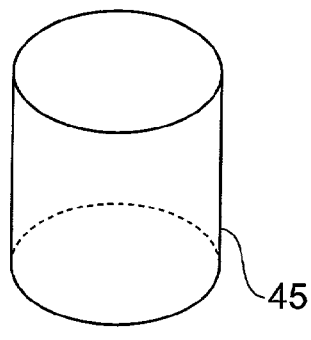
FIGS. 2A to 2F show a method of making a fiber stub.

In the following, with reference to the drawings, a method of making the fiber stub 40 will be explained in detail. FIGS. 2A to 2F show the method of making the fiber stub 40. First, in this method, a columnar body 45 is prepared (FIG. 2A). The columnar body 45 can be made when ceramics such as zirconia is molded into a cylindrical form. The outer diameter of the columnar body 45 is determined in view of the outer diameter of the ferrule of the optical plug to be optically coupled with the fiber stub 40. The height of the columnar body 45 is determined in view of the length of the fiber Bragg grating 42c incorporated in the fiber stub 40. Specifically, when the length of the grating 42c is 1.5 mm to 2.5 mm, the height of the columnar body 45 may be 2.5 mm to 3 mm.

Figure 2B:
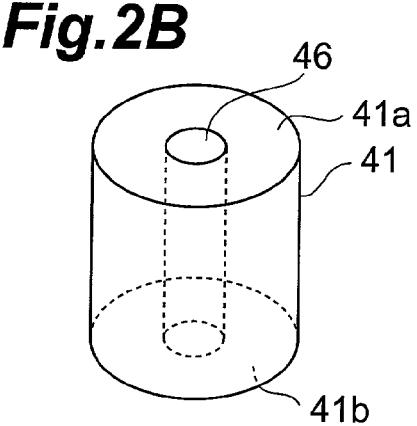
Figure 2C:
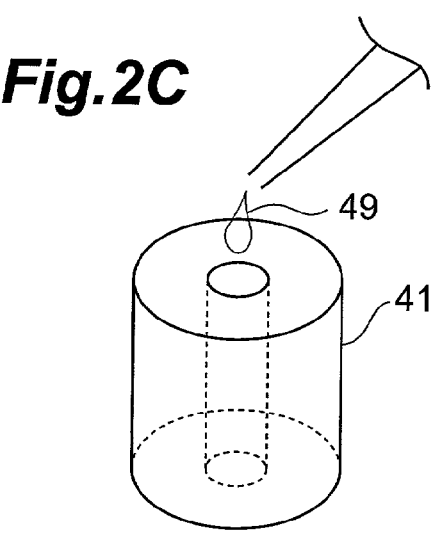

After the columnar body 45 is prepared, a hole 46 passing through the columnar body 45 along its center axis is provided. The diameter of the hole 46 is appropriately determined according to the fiber 42 to be inserted into the hole 46. The diameter of the hole 46 may be about 125 μm, for example. Forming the hole 46 completes the ferrule 41 (FIG. 2B).

Figure 2D:
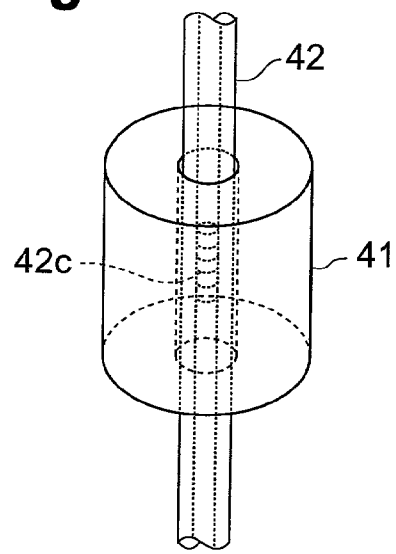

Subsequently, a thermosetting adhesive 49 is injected into the hole 46 (FIG. 2C), and the optical fiber 42 is inserted into the hole 46 (FIG. 2D). The fiber 42 has a fiber Bragg grating 42c. On the insertion of the fiber 42, the grating 42c is placed in the middle portion of the ferrule 41.

The optical fiber with the fiber grating may be made as follows. An optical fiber made of silica glass is prepared. The fiber includes an agent, such as $GeO_2$, for inducing refractive index change by light irradiation. The fiber is irradiated with ultraviolet light. The ultraviolet light has a spatial intensity distribution that changes periodically. The irradiation forms the fiber grating within the fiber. Giving a typical value as an example, the grating pitch may be about 0.53 μm. If the length of the grating is 1.5 mm to 2.0 mm, the grating can sufficiently act as a laser cavity. The Bragg reflection wavelength of the grating with the pitch mentioned above can provide a wavelength band of 1550 nm for the laser light.

A plurality of gratings can be formed efficiently in a single optical fiber. Particularly, when irradiation with ultraviolet light is intermittently repeated while moving an optical fiber along its length, many gratings can be formed in a short time. Also, gratings with different pitches and/or lengths can be sequentially formed while moving the fiber along its length. When the fiber is cut grating by grating, a large number of short optical fibers each including a single grating can be obtained. The fiber stub in accordance with the present invention may be made with such a short optical fiber. When a variety of gratings with respective Bragg reflection wavelengths are prepared, optical modules with various laser oscillation wavelengths can be made.

Figure 2E:
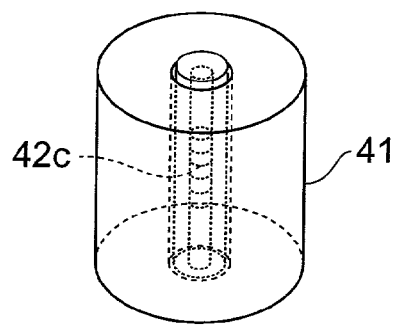

Referring to the drawings again, the fiber 42 is inserted into the hole 46 (FIG. 2D), and then the fiber 42 is cut so as to project from both ends of the hole 46 by about 0.5 mm, respectively. Thereafter, the ferrule 41 is heated to cure the adhesive (FIG. 2E).

Figure 2F:
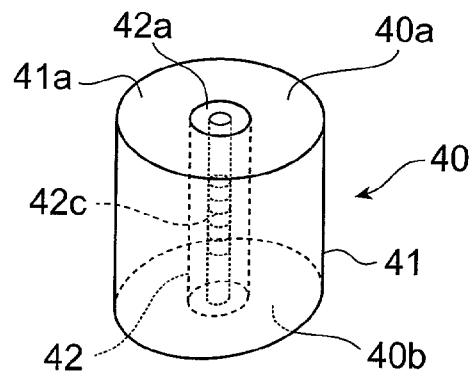

Subsequently, the upper and lower faces of the ferrule 41 are ground. In the grinding, both end faces of the optical fiber 42 projecting from the hole 46 are ground. As a result, the first end face 40a and second end face 40b of the fiber stub 40 are formed (FIG. 2F).

The grinding tilts the second end face 40b with respect to the center axis of the fiber 42. As mentioned above, the tilted angle is preferably at least 82° but not greater than 86°.

Also, at a result of the grinding, the first end face 42a of the optical fiber 42 may slightly project from the first end face 41a of the ferrule 41. In this case, the fiber 44 in the plug 2 and the fiber 42 in the fiber stub 40 are likely to come into physical contact with each other when the leading end of the optical plug 2 is inserted into the space 35 in the inner sleeve 33. As a result, the light transmitted through the fiber 42 is efficiently introduced into the external fiber 44 without being reflected by the end face of the external fiber 44.

In the following, operations of the optical module 1 will be explained. When a current is applied to the optical amplifying device 20, light is emitted from the light-emitting face of the device 20. The emitted light is converged by the lens 16 to enter the second end face 42b of the fiber 42.

In the light introduced into the fiber 42, a light component with a wavelength substantially the same as the Bragg reflection wavelength of the grating 42c is reflected by the grating 42c. The reflected light is emitted from the fiber 42 toward the lens 16. Thereafter, the reflected light passes through the lens 16 to reach the light-emitting face of the optical amplifying device 20. The light passes through the light-emitting face to penetrate the device 20. Then, the light is reflected by the light-reflecting face of the device 20. Subsequently, the light is repeatedly reflected between the light-reflecting face and the grating 42c, and thereby amplified to cause laser oscillation. That is, the grating 42c and the light-reflecting face constitute a laser cavity. The length of the cavity, i.e., the distance between the grating 42c and the light-reflecting face, can be adjusted by the height of the holder 31.

The laser light is transmitted through the grating 42c to go out from the first end face 42a of the fiber 42. The first end face 42a is in contact with the end face of the external fiber 44 when the plug 2 is connected to the module 1. Therefore, the laser light enters the fiber 44. Consequently, the laser light going out of the module 1 is introduced into the external fiber 44.

In the optical module 1, as mentioned above, a laser cavity is constituted by the light-reflecting face of the optical amplifier 20 and the grating 42c in the fiber stub 40. The cavity causes laser oscillation. The laser light generated by the laser oscillation passes through the grating 42c and goes out of the fiber 42. The external fiber 44 into which the laser light is to be introduced is optically coupled to the fiber 42 in the stub 40 by the inner sleeve 33. Therefore, the laser light is efficiently introduced into the external fiber.

The fiber stub 40 is short because it has no pigtail fiber. The optical module 1 is small in size because it is constructed with such a short fiber stub 40. Also, the fiber 42 with the grating 42c in the stub 40 can be easily formed with a good mass-productivity by irradiating an optical fiber with ultraviolet light. When the fiber 42 is inserted into the through hole 46 of the ferrule 41 and then end faces of the ferrule 41 are ground, the fiber stub 40 is obtained. Therefore, the fiber stub 40 can be made with a good mass-productivity as well.

Also, fiber gratings with various Bragg reflection wavelengths can be obtained by simply changing the period of the intensity distribution of the ultraviolet light to be irradiated to an optical fiber. Therefore, fiber stubs 40 with various Bragg reflection wavelengths can be made easily. When the fiber stubs 40 with various Bragg reflection wavelengths are used, optical modules 1 with various oscillation wavelengths can be made easily.

Each of the holder 31, outer sleeve 32, inner sleeve 33, and fiber stab has a form axially symmetrical about the optical axis of the optical fiber 42. Therefore, the optical module 1 is easy to handle, and its optical axis can be aligned easily with that of another optical component.

Figure 3:
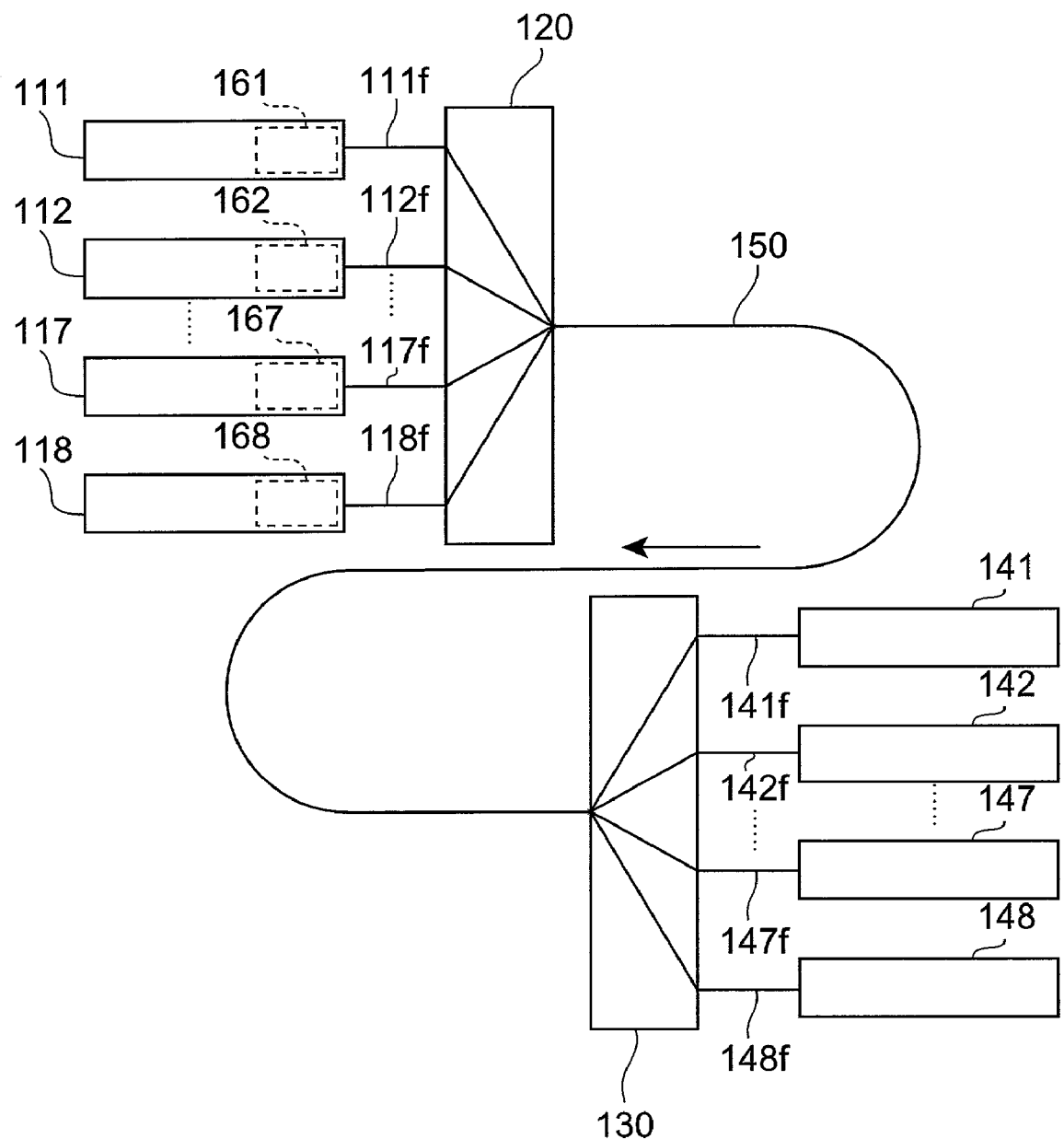
FIG. 3 is a schematic diagram showing the configuration of an embodiment of the multiwavelength optical communication system in accordance with the present invention.

In the following, embodiments of the optical transmitter and optical communication system in accordance with the present invention will be explained. FIG. 3 is a schematic diagram showing the configuration of the optical communication system. The system is constructed by using the above-mentioned optical module 1.

The optical communication system 100 comprises optical transmitters 111 to 118, an optical multiplexer 120, an optical demultiplexer 130, and optical receivers 141 to 148. The transmitters 111 to 118 are connected to the optical multiplexer 120 by use of optical fibers 111f to 118f, respectively. The optical multiplexer 120 and the optical demultiplexer 130 are connected to each other by use of an optical fiber channel 150. The optical demultiplexer 130 is connected to the receivers 141 to 148 by use of optical fibers 141f to 148f, respectively.

Optical modules 161 to 168 with different oscillation wavelengths are placed in the transmitters 111 to 118, respectively. Each of the optical modules 161 to 168 has a configuration substantially the same as that of the optical module 1. The fiber stubs 40 included in the optical modules 161 to 168 have gratings 42c whose Bragg reflection wavelengths are $\lambda_1$ to $\lambda_8$, respectively. Therefore, the modules 161 to 168 emit laser beams with wavelengths of $\lambda_1$ to $\lambda_8$, respectively. For example, $\lambda_1=1536.6$ nm, and $\lambda_{i+1}=\lambda_i+3.2$ nm (where i is a natural number of 7 or smaller).

An output apparatus, which is not shown, is connected to each of the transmitters 111 to 118. Predetermined electric signals are sent from the individual output apparatus to their corresponding transmitters 111 to 118.

In the following, operations of the optical communication system 100 will be explained. The transmitters 111 to 118 receive respective electric signals from their corresponding output apparatuses. In the transmitters 111 to 118, the electric signals are converted into optical signals by the optical modules 161 to 168. The optical modules 161 to 168 send the laser beams having wavelengths of $\lambda_1$ to $\lambda_8$ including the optical signals to the optical fibers 111f to 118f, respectively. These laser beams reach the optical multiplexer 120 by way of the optical fibers 111f to 118f, respectively. Thereafter, the laser beams are multiplexed into a signal light by the optical multiplexer 120. The multiplexed signal light reaches the optical demultiplexer 160 by way of the optical fiber channel 150. In the optical demultiplexer 160, the signal light is demultiplexed into signal light components with wavelengths of $\lambda_1$ to $\lambda_8$. The signal light components reach the receivers 141 to 148 by way of the optical fibers 141f to 148f, respectively. In the receivers 141 to 148, the signal light components with wavelengths of $\lambda_1$ to $\lambda_8$ are converted into electric signals, which are outputted to external circuits.

Like the optical module 1, the optical modules 161 to 168 are small in size. Therefore, the transmitters 111 to 118 can be easily made smaller.

A plurality of optical modules 161 to 168 with different oscillation wavelengths can easily be made using the fiber stubs 40 with different Bragg reflection wavelengths. Therefore, the multiwavelength optical communication system in accordance with the embodiment can be constructed easily.

Second Embodiment

In the following, a second embodiment of the optical module in accordance with the present invention will be explained. FIG. 4 shows a longitudinal section of the optical module 50 in accordance with this embodiment. FIG. 4 also shows the side face of an example of optical plug 300 to be connected to the optical module 50.

In the optical module 50, a fastener 320 is used in place of the outer sleeve 32 of the above optical module 1. Except for this point, the module 50 has substantially the same configuration as the module 1. In the following, the difference between these modules will be explained mainly.

The optical module 50 is provided with the thread type fastener 320. The fastener 320 acts as a connecting member for an external optical plug. The fastener 320 also acts as a holding member for holding the inner sleeve 33 and the fiber stub 40. The outer side face of the upper end of the fastener 320 has an external thread 321. The fastener 320 may be made of stainless steel.

The fastener 320 has a hole 320a passing through the fastener 320 along its center axis. The inner sleeve 33 and the fiber stub 40 are held within the hole 320a. A ferrule 300a of the optical plug 300 is inserted into the space 35 defined by the inner face of the inner sleeve 33 and the first end face 40a of the fiber stub 40. The optical plug 300 will be explained later. An optical fiber 42 is provided within the fiber stub 40. The optical fiber 42 is optically coupled to the optical amplifying device 20 by way of a lens 16.

The lower end of the fastener 320 is provided with a flange 320b. The flange 320 has a plurality of through holes 320c arranged about the center axis of the flange 320. The through holes 320c are used for inserting screws when securing the fastener 320 to a panel or the like.

The optical plug 300 shown in FIG. 4 is fastened to the fastener 320. The plug 300 has the ferrule 300a, a sleeve 300b, and a ring 300c. An optical fiber 350 is inserted into the ferrule 300a. The ferrule 300a is inserted into the sleeve 300b. The ring 300c is rotatably attached onto the outer side face of the sleeve 300b. The inner side face of the ring 300c has an internal thread. The internal thread has the same pitch as that of the external thread on the fastener 320. Therefore, the fastener 320 and the plug 300 can be threaded together.

A protrusion 301b is provided on the outer side face of the sleeve 300b. The protrusion 301b can fit into a cutout (not shown) provided in the fastener 320. When the protrusion 301b fits with the cutout, the optical fiber 350 can be prevented from twisting when rotating the ring 300c.

In the optical module 50, as in the optical module 1, a laser cavity is constituted by the light-reflecting face of the optical amplifying device 20 and the Bragg grating 42c within the fiber stub 40. The laser cavity generates laser oscillation. The laser light generated by the laser oscillation is emitted through the grating 42c.

When the ferrule 300c is inserted in the space 35 within the optical module 50, the external optical fiber 350 and the fiber stub 40 are optically coupled. Therefore, the optical module 50 exhibits the same effects as the optical module 1 in accordance with the first embodiment does. Further, since the threaded optical plug 300 and threaded fastener 320 are used, the external optical fiber 350 can be connected and secured to the optical module 50 firmly.

Figure 5A:
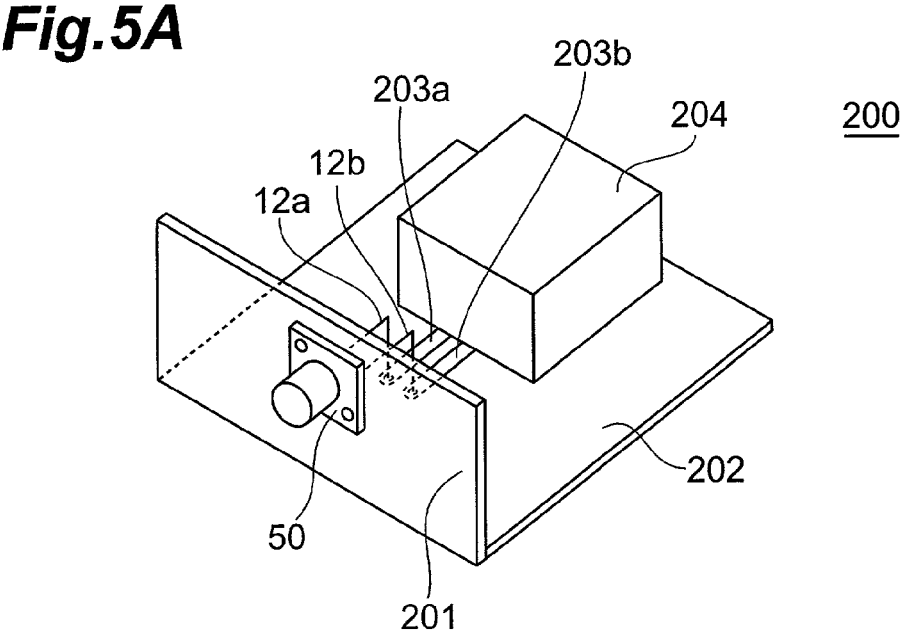
FIG. 5A is a schematic perspective view showing the configuration of an embodiment of the optical transmitter in accordance with the present invention.

In the following, an optical transmitter comprising the optical module 50 will be explained. FIG. 5A is a schematic perspective view showing an example of optical transmitter 200. For comparison, FIG. 5B shows an example of an optical transmitter comprising an optical module in the prior art.

In the optical transmitter 200 shown in FIG. 5A, the optical module 50 is fastened to a panel 201 by screwing. Lead pins 12a and 12b of the optical module 50 are bent like letter L. Leading ends of the lead pins 12a and 12b are soldered to electrical wiring patterns 203a and 203b on a substrate 202. The wiring patterns 203a and 203b are electrically connected to a driving circuit 204. The driving circuit 204 sends a driving signal to the optical module 50 via the wiring patterns 203a, 203b and lead pins 12a, 12b, and thereby drives the optical amplifying device 20 in the optical module 50. Also, an output signal from the PD 21 in the optical module 50 is sent to the driving circuit 204 via lead pins and wiring patterns that are not shown. The driving circuit 204 has an input terminal (not shown) for receiving an electric signal from a peripheral circuit.

Figure 5B:
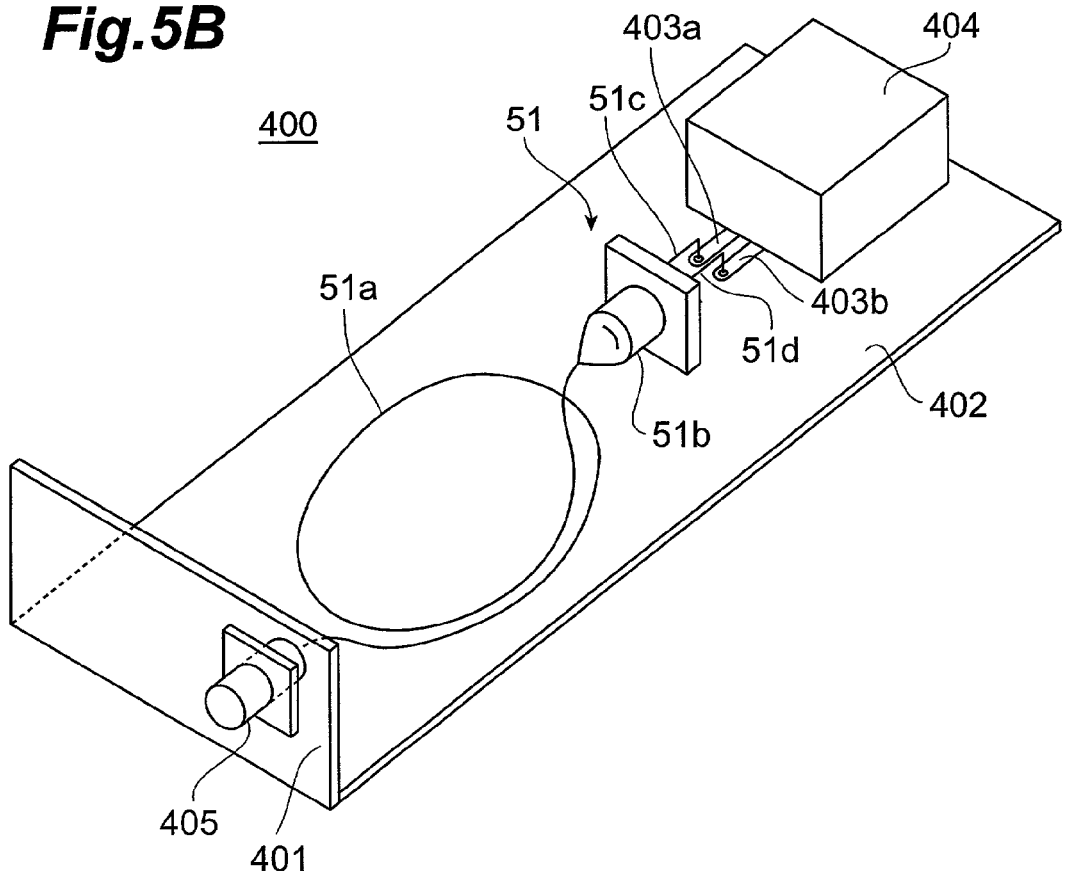
FIG. 5B is a schematic perspective view showing the configuration of an optical transmitter in accordance with the prior art.

On the other hand, the optical transmitter 400 shown in FIG. 5B uses an optical module 51 of the prior art. In the optical module 51, unlike the optical module 50, a pigtail type optical fiber 51a extends from a package 51b. The length of the fiber 51a is about 1 m, for example. A grating (not shown) is formed in the fiber 51a. The grating constitutes a laser cavity together with the light-reflecting face of an optical amplifying device (not shown).

An optical connector 405 is secured to a panel 401. The fiber 51a extending from the optical module 51 is connected to one end of the connector 405. An external optical fiber (not shown) into which light emitted from the module 51 is to be introduced is connected to the other end of the connector 405.

Lead pins 51c and 51d of the module 51 are bent like letter L. Leading ends of the lead pins 51c and 51d are soldered to wiring patterns 403a and 403b on the substrate 402, respectively. The wiring patterns 403a and 403b are connected to a driving circuit 404. The driving circuit 404 has an input terminal (not shown) for receiving an electric signal from a peripheral circuit.

As shown in FIG. 5B, the pigtail fiber 51a with a length of about 1 m is wound like a coil and mounted on a substrate 402 in the optical transmitter 400. In view of the bending loss, it is necessary to wind the fiber 51a like a coil with a diameter of about 10 cm. Since the space for mounting the coil-shaped fiber 51a is necessary on the substrate 402, the substrate 402 is large.

On the other hand, as can be seen when FIGS. 5A and 5B are compared, the substrate 202 can be smaller in the optical transmitter 200 including the optical module 50. This is because that the optical module 50 does not include the pigtail fiber and therefore the optical module 50 is small. Thus, the optical transmitter can be made smaller if the optical module in accordance with the present invention is used.

The optical module in accordance with the present invention is explained with reference to some embodiments in the foregoing. However, the present invention is not restricted to the above-mentioned embodiments. The present invention can be modified in various manners.

In the above-mentioned embodiments, the fiber stub 40 is cylindrical. However, the cross-sectional form of the fiber stub may be a polygon such as hexagon or octagon.

The optical module 50 in accordance with the second embodiment is a receptacle using the thread type fastener 320. Alternatively, the optical module in accordance with the present invention may comprise a connector structure of FC type, SF type, FA type, D type, or OF-2 type.

Means for securing the external optical fiber to be connected to the optical module in accordance with the present invention may be chosen arbitrarily. This is because that the sleeve within the optical module (inner sleeve 33 in the above-mentioned embodiments) ensures the optical coupling between the fiber stub and external optical fiber.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising:
   a fiber stub including an optical fiber with a fiber grating, and a ferrule holding said optical fiber,
   said fiber having first and second end faces,
   said ferrule having first and second ends, the first end including a first end face, and the second end including a second end face, and
   said optical fiber extending from the first end to the second end of said ferrule, the first end face of said optical fiber being flush with the first end face of said ferrule, and the second end face of said optical fiber being flush with the second end face of said ferrule;
   a semiconductor optical amplifying device having a light-emitting face and a light-reflecting face, the light-emitting face opposing the second end face of said optical fiber, and the fiber grating and the light-reflecting face forming a laser cavity;
   a sleeve into which said fiber stub is fitted, the second end face of said optical fiber being arranged at an end of said sleeve, and said sleeve including a hollow portion at the other end thereof, and
   a hollow holder containing said optical amplifying device and having an upper wall with a through hole through which light emitted from said optical amplifying device passes, the upper wall having an outer face onto which said fiber stub is secured, and the second end face of said ferrule being in contact with the upper wall.

2. An optical module according to claim 1, wherein the second end face of said optical fiber is tilted with respect to an optical axis of said optical fiber.

3. An optical module according to claim 2, wherein said tilted end face and the optical axis of said optical fiber form an acute angle of at least 82° but not greater than 86° therebetween.

4. An optical module according to claim 1, wherein an antireflection film is provided on the second end face of said optical fiber.

5. An optical module according to claim 1, further comprising a lens system disposed between said optical amplifying device and said fiber stub.

6. An optical module according to claim 5, wherein said lens system comprises a single lens or complex lens.

7. An optical module according to claim 1, wherein said optical module is an optical receptacle, the hollow portion of said sleeve being adapted to contain the end of an optical plug to be connected to said receptacle.

8. An optical module according to claim 1, further comprising:
   a stem having an upper face for mounting said optical amplifying device thereon;
   a lead terminal electrically connected to said optical amplifying device, said lead terminal extending through said stem; and
   a cap for covering said optical amplifying device, said cap being placed on the upper face of said stem;
   wherein said hollow holder is attached to said stem;
   wherein said holder contains said cap;
   wherein said cap has an upper wall, the upper wall having a through hole; and
   wherein, said light emitted from said optical amplifying device passes through the holes of said cap and holder to enter the second end face of said optical fiber.

9. An optical module according to claim 8, further comprising a single lens or complex lens mounted in the hole in the upper wall of said cap.

10. An optical module according to claim 8, wherein each of said fiber stub, sleeve, and holder has a form axially symmetrical about the optical axis of said optical fiber.

11. An optical transmitter comprising:
    a substrate;
    a panel erected on said substrate;
    the optical module according to claim 1 attached to said panel;
    a driving circuit provided on said substrate; and
    electrical wiring provided on said substrate, said wiring electrically connecting said optical module to said driving circuit;
    wherein said driving circuit supplies a driving signal to said optical module via said wiring.

12. An optical communication system comprising:
    an optical transmitter;
    an optical receiver; and
    an optical fiber channel connected between said optical transmitter and said optical receiver;
    wherein said optical transmitter includes the optical module according to claim 1.

13. An optical communication system comprising:
    a plurality of optical transmitters;
    an optical multiplexer optically coupled to said plurality of optical transmitters;
    an optical fiber channel having one end connected to said optical multiplexer;
    an optical demultiplexer connected to the other end of said optical fiber channel; and
    a plurality of optical receivers optically coupled to said optical demultiplexer;
    wherein each of said optical transmitters includes the optical module according to claim 1; and
    wherein said optical modules have respective oscillation wavelengths different from each other.

* * * * *